United States Patent [19]
Buchsteiner, deceased et al.

[11] 3,830,477
[45] Aug. 20, 1974

[54] CLAMPING RING

[75] Inventors: Hans Buchsteiner, deceased, late of Gingen/Fils, Germany by Renate Buchsteiner, nee Fetzer, executrix; Helga Bernhardt, nee Knobel, Reutlingen-Betzingen; Hubert Kowalski, Alfdorf, both of Germany

[73] Assignee: Bruno Bernhardt

[22] Filed: June 2, 1971

[21] Appl. No.: 149,239

[30] Foreign Application Priority Data
June 2, 1970 Germany............................ 2026826

[52] U.S. Cl. .............................................. 267/161
[51] Int. Cl. .............................................. F16c 1/34
[58] Field of Search ........... 267/161, 162, 152, 153, 267/140, 141

[56] References Cited
UNITED STATES PATENTS
1,826,597 10/1931 Brecht................................ 267/162
2,675,225 4/1954 Migny................................. 267/162
3,402,489 9/1968 Schlessel........................... 267/161
3,504,900 4/1970 Torr.................................... 267/140
3,682,466 8/1972 Huchette ........................... 267/161

Primary Examiner—James B. Marbert
Attorney, Agent, or Firm—Craig & Antonelli

[57] ABSTRACT

An elastic clamping ring as machine element in which the clamping ring is constructed as endless ring with annular cross section and has a supporting center section, from which extend radially inwardly and radially outwardly projecting extensions along the ring circumference, these extensions possess a smaller moment of resistance than the supporting center section so that the extensions move seesaw-like about the center section when one of the extensions is compressed or expanded.

42 Claims, 10 Drawing Figures

*INVENTOR.*
HANS BUCHSTEINER, DECEASED,
BY RENATE BUCHSTEINER, EXECUTRIX

Craig, Antonelli & Hill

ATTORNEYS

CLAMPING RING

The present invention relates to an elastic clamping ring as machine element, for example, for sealing-, setting-, locking-, or coupling-purposes.

For locking purposes, there are available, for example, the known radially slotted snap rings or also endless rings with radially projecting lugs or inclined sections, which during the axial emplacement lock radially with the respective operating part. Furthermore, for clamping purposes, multi-partite ring sets are known which are clamped by way of cone surfaces and an external tightening nut or the like to each other and to the respective operating part. For sealing purposes, special rubber elements are known with a base section of the ring cross section abutting, for example, at a housing with a formed-on sealing lip that surrounds, for example, a shaft to be sealed. All of these machine elements entail the disadvantage that they can be used only for the specially intended purpose and/or consist of several parts and/or are able to produce only a relatively low clamping pressure.

The present invention is concerned with the task to provide an elastic clamping ring adapted to be reusable repeatedly, which can be used, on the one hand, as machine element for several purposes, for example, for sealing-, setting-, locking- or coupling-purposes, and, on the other hand—with a simple construction—makes possible a high clamping pressure. As solution to the underlying problem, the elastic clamping ring according to the present invention as an endless ring possesses a ring cross section with a supporting center section from which extend along the circumference, on the one hand, radially inwardly projecting extensions and, on the other, radially outwardly projecting extensions with lesser radial moment of resistance, which during the compression or expansion are movable rocker-like about the supporting center section having a greater radial moment of resistance.

The clamping ring according to the present invention therefore essentially consists of a single part whose ring cross section in the center has a center section with a relatively much greater radial moment of resistance against compression or expansion than the adjoining extensions, of which on one end face one extension projects radially inwardly and at the other end face another extension projects radially outwardly. It has been found that during the radial compression of one extension, the other extension—even if the extensions involve ring sections also endless in the circumferential direction—is expanded or compressed rocker-like in the opposite radial direction by means of a tilting movement taking place about the center section. As a result thereof, this extension may be mounted, for example, on the provided shaft. During the release of the other extension, it then clamps itself fast. Depending on the dimensions and/or the utilized material, clamping pressures can be produced thereby which were considered impossible heretofore in connection with such clamping elements. It is thereby not necessary that the shaft or an internal bore be prepared especially, for example, be provided with grooves or the like. The clamping ring can be assembled onto a completely smooth shaft or into a completely smooth internal bore.

According to a further development of the present invention, the radial moment of resistance of the supporting center section is made so large that the supporting center section—upon application of forces within the rated force range—remains essentially uninfluenced from the tilting movements taking place in unison with the compression or expansion of the extensions about the center section. That is, the supporting center section is not compressed during the tilting movement of the two extensions. This can be achieved either by a correspondingly large cross section or by a especially reinforced inner construction of the center section. According to a further feature of the present invention, the inner diameter of the ring at the supporting center section is larger than the smallest inner diameter of the ring at the inwardly extending extension and/or the outer diameter of the ring at the supporting center section is smaller than the largest outer diameter of the ring at the outwardly projecting extensions. According to another significant further development of the present invention, the inner and outer diameter of the ring at the supporting center section is thereby larger and smaller, respectively, than the largest and smallest diameter within the given tolerance range of the provided operating part. Consequently, according to the present invention, the supporting center section does not come into abutment at the provided operating part, for example, at a shaft and at the associated housing, and more particularly, for example, neither at the shaft nor at the housing. As a result thereof, the common tilting movement of the two extensions, i.e., occurring in unison according to the present invention during the compression or expansion may take place independently of the respective used-operating parts both during the assembly as also during the disassembly of the clamping ring. The supporting center section is therefore influenced only by way of the extensions so that the intended tilting movement may always occur.

According to a further improvement of the present invention, the two extensions have an approximately equal radial moment of resistance, and more particularly, preferably by means of an approximately identical cross-sectional shape. As a result thereof, the extent of movement of one extension corresponds to the extent of movement applied to the other extension.

In a preferred construction of the present invention, the two extensions have essentially rectilinear side flanks. Furthermore, one side flank of one extension is appropriately as parallel as possible to the diametrically opposite side flank of the other extension, preferably in such a manner that the respective innermost and outermost side flanks of the two extensions extend approximately parallel to the axial direction in the clamped condition of the clamping ring.

In a preferred embodiment of the present invention, the two extensions taper from the center section to the free end thereof, and more particularly advantageously in a uniform manner approximately conically shaped, preferably with a cone apex angle of the order of magnitude of about 30°–60°, especially approximately 40°–50°.

According to a further development of the present invention, the ring cross section extends obliquely to the axial direction, and more particularly preferably at an angle of the order of magnitude of about 30°–60°, especially approximately 40°–50°.

The supported center section is appropriately constituted of an approximately circularly shaped core cross section whereby the increased moment of resistance with respect to the two extensions is obtained exclusively by the larger cross-sectional dimensions and the cross-sectional shape. Within the scope of the present invention, however, it is also possible to provide in or at the supporting center section, special armoring means and/or reinforcing sections.

In completion of the present invention, the extensions are constructed edge-like at the radially inwardly projecting and radially outwardly projecting inner and outer ends thereof, possibly with the cone apex cut off preferably at an angle of about 45° to the axial direction.

It may suffice for certain clamping purposes if the respective extensions consist of a series of cams or the like distributed in the circumferential direction whereby a rim of such cams or the like is to be understood in such case by the term "extension." In a preferred type of construction of the present invention, however, the extensions are in each case also annular sections endless in the circumferential direction.

The clamping ring according to the present invention has numerous advantageous applications. It may be used, for example, as clamp of a sealing sleeve. It is thereby possible in particular to form the same in one piece at the used operating part, for example, at the sealing sleeve. With the use as interchangeable rollers, for example, for printing presses and sheet-feeding apparatus, a roller may be mounted on, for example, may be vulcanized onto the outwardly projecting extension, whereby a considerable simplification results compared to the known types of construction with collar and set screws.

In another embodiment of the present invention, a radial section is formed integral at least at one of the two extensions as axially clampable sealing section. The clamping ring according to the present invention may thereby serve as coupling means and simultaneously as seal between two pipes whereby at least one pipe is retained rotatable and longitudinally displaceable and as a result of the possible, extraordinarily high clamping pressure can be relatively rough without significantly impairing the seal.

Another advantageous application resides in that a labyrinth seal is formed from at least two such clamping rings—of a clamping ring clamped inwardly thereof and of a clamping ring clamped outwardly thereof—whereby one clamping ring is clamped, for example, onto the shaft and the adjacent clamping ring is clamped fast within the surrounding housing.

The clamping ring according to the present invention may be made, for example, as extruded or injection-molded synthetic resinous part, for example, of polyamide. The type of the plastic material and dimensions are selected depending on the desired elasticity. However, it is also possible to make the clamping ring of steel, for example, of springy pliers steel whereby immense clamping pressures, deemed impossible to date, can be produced. It suffices thereby if, for example, the extension to be clamped is expanded with respect to the opposite extension by 5/100 mm. in order to mount the same over a shaft or the like of corresponding tolerance.

These and further objects, features and advantages of the present invention will become more obvious from the following description when taken in connection with the accompanying drawing, which shows, for purposes of illustration only, several embodiments in accordance with the present invention, and wherein.

Figure 1:
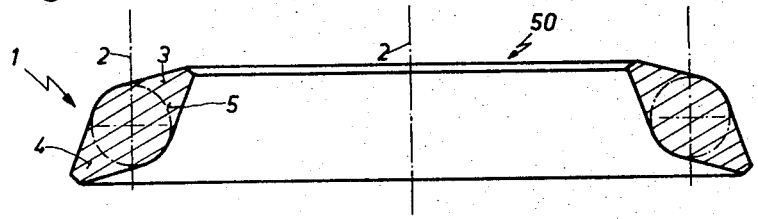
FIG. 1 is a vertical cross-sectional view through one embodiment of a clamping ring according to the present invention.
Figure 2:
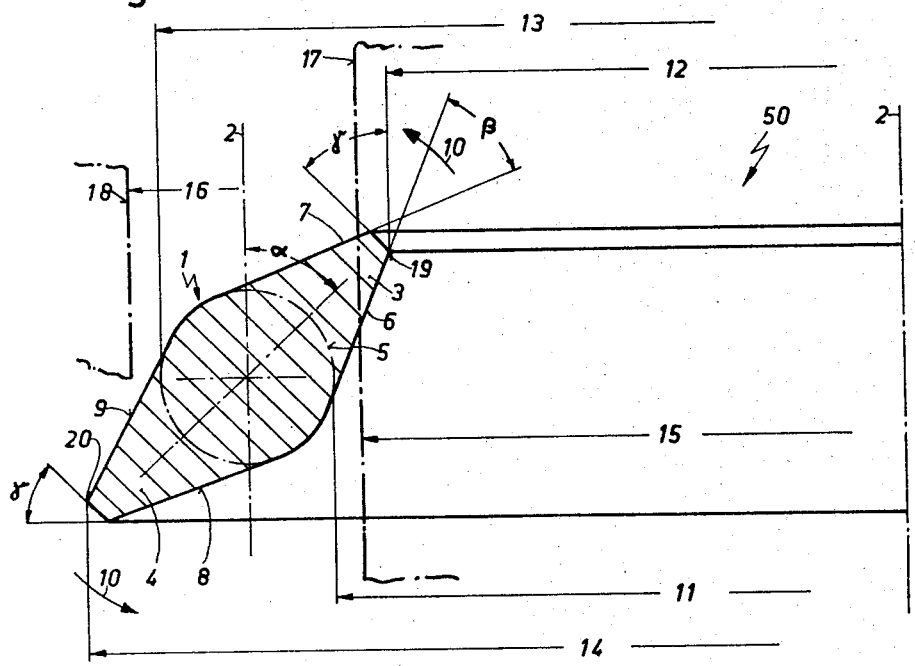
FIG. 2 is an enlarged partial view of the ring cross section according to FIG. 1.

Referring now to the drawing wherein like reference numerals are used throughout the various views to designate like parts and, more particularly, to FIGS. 1 and 2, the clamping ring illustrated in these figures and generally designated therein by reference numeral 50 is an endless ring and consists of a supporting center section generally designated by reference numeral 1 with two extensions 3 and 4 projecting diametrically from the center section 1 obliquely at an angle α of about 47° to the axial direction 2; one of the extensions 3 and 4, as shown in the drawing, thereby projects radially inwardly and the other extension radially outwardly. The center section 1 is formed of a circularly shaped core cross section 5. The two adjoining extensions 3 and 4 taper to the free edge thereof substantially uniformly and conically shaped, and more particularly with a cone apex angle β of about 47°. Due to the conical shape two extensions 3 and 4 possess straight side flanks 6, 7 and 8, 9. One side flank 6 of the extension 3 is thereby disposed parallel, except for example, for an angle of up to 3°, with respect to the diametrically opposite side flank 9 of the other extension 4. The two side flanks 7 and 8 are disposed similarly with respect to each other. The dimensions and the elasticity can be selected thereby depending on the intended application in such a manner that the respective innermost and outermost side flanks, for example, the side flanks 6 and 9 of the two extensions 3 and 4 extend in the clamped condition of the clamping ring as parallel as possible to the axial direction 2, or at least approximately parallel thereto.

As shown in the drawing, the circularly shaped core cross section 5 of the center section 1 is considerably larger in the radial direction than the cross section of the extensions 3 and 4. Depending on the size of this core cross section 5 and of the extensions 3 and 4, the moment of resistance of the center section 1 in the radial direction may be considerably larger, for example, larger by a multiple than that of the extensions 3 and 4. As a result thereof, the extensions 3 and 4 are movable seesaw-like in the direction of arrow 10 about the supporting center section 1 during the compression or expansion. In the illustrated embodiment, the moment of resistance of the supporting center section 1 is made so large by the size of the core cross section 5 that the supporting center section 1—during application of forces within the rated force range—remains essentially uninfluenced from the common tilting movement in the direction of arrow 10 taking place in unison about the center section 1 during the compression or expansion of the extensions 3 and 4. According to the present invention, the ring inner diameter 11 at the supporting center section 1 is larger than the smallest ring inner diameter 12 at the inwardly projecting extension 3. Furthermore, the ring outer diameter 13 at the supporting center section 1 is smaller than the largest ring outer diameter 14 at the outwardly projecting extension 4. Additionally, according to the present invention, the ring inner diameter 11 and the ring outer diameter 13 at the supporting center section are, respectively, larger and smaller than the largest and smallest diameters 15 and 16 within the tolerance range of a used operating part 17 or 18. The clamping ring, therefore, abuts in the clamped condition by way of its extension 3 or 4 at the part 17 or 18 whereas the supporting center section 1 remains lifted off. The desired tilting movement in the direction of arrow 10 is achieved thereby if, for example, the extension 4 is compressed by means of a tool whereby the extension 3 expands or spreads up to the point where it lifts off from the used part 17. In order to attain a symmetrically identical force behavior, the two extensions 3 and 4 have an approximately identical radial moment of resistance and, for this purpose, an approximately identical cross-sectional shape in the illustrated embodiment. The entire ring cross section is constructed symmetrically with respect to its inclined axis disposed at the angle $\alpha$ to the axial direction 2 and with respect to an axis disposed perpendicular thereto and extending through the center of the core cross section 5.

The extensions 3 and 4 are cut off at the radially inwardly and radially outwardly projecting inner and outer edge at 19 and 20. For that purpose, the cone apeces are cut off at the angle $\gamma$ of about 45° to the axial direction 2. The clamping ring produces a high sealing effect by means of these edges 19 and 20.

Figure 3:
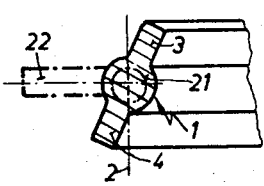
FIGS. 3, 4 and 5 are ring cross-sectional views through modified embodiments of clamping rings according to the present invention.

A modified embodiment is illustrated in FIG. 3 in which the center section 1 is provided with an inner armoring 21 and/or with external reinforcing section 22. The remaining construction is, in principle, the same as according to FIGS. 1 and 2.

Figure 4:
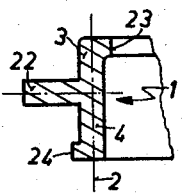

In the embodiment according to FIG. 4, the extensions 3 and 4 are not inclined but extend in the axial direction 2 and for the engagement are provided with radial sections 23 and 24, enlarged inwardly and outwardly, respectively. The center section 1 receives its higher radial moment of resistance exclusively from a radially outwardly projecting reinforcing section 22.

Figure 5:
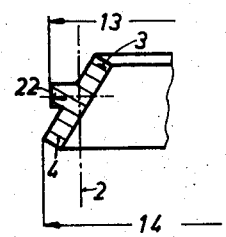

The embodiment according to FIG. 5 illustrates a combination of the features of FIGS. 3 and 4. The extensions 3 and 4 are again inclined to the axial direction 2 whereas the center section 1 receives its higher radial moment of resistance exclusively from a radially outwardly projecting reinforcing section 22 whose outer diameter 13, however, as in FIGS. 1 and 2, is smaller than the maximum outer diameter 14 of the outwardly projecting extension 4.

Figure 6:
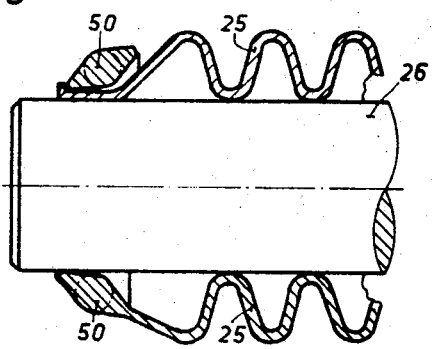
FIGS. 6–10 are partial cross-sectional views, representing various applications of the present invention with the respective used operational parts.

In the application according to FIG. 6, the clamping ring 50 of the present invention serves to clamp a sealing sleeve 25 onto a shaft 26. In the upper half of FIG. 6, the sealing sleeve 25 and the clamping ring 50 are separate parts whereas in the lower half of FIG. 6, a type of construction is illustrated in which the clamping ring 50 is formed at and in one piece with the sealing sleeve 25'.

Figure 7:
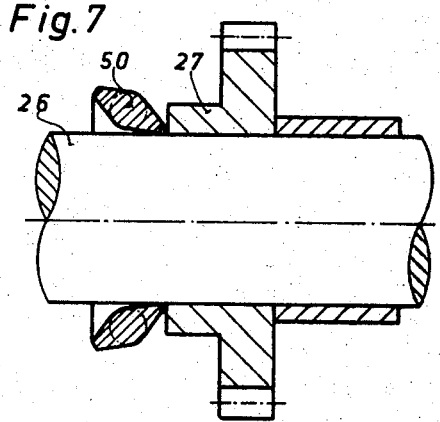

In the application according to FIG. 7, the clamping ring 50 according to the present invention serves as adjusting and locking ring in order to secure a gear wheel 27 on a shaft 26.

Figure 8:
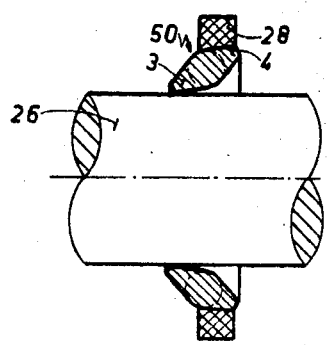

In the application according to FIG. 8, a roller 28 is vulcanized onto the outwardly projecting extensions 4 of the clamping ring 50. With the inner extension 3, the clamping ring 50 rests on a shaft 26 and serves as roller, for example, in a conventional sheet feed apparatus. A plurality of such clamping rings each provided with a roller 28 may thereby be arranged adjacent one another whereby all clamping rings are readily interchangeable by means of suitable tools.

Figure 9:
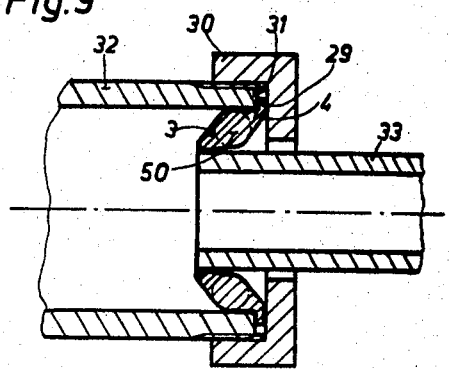

In the embodiment according to FIG. 9, a radially outwardly projecting section 29 is formed integrally as sealing section at the outer extension 4 of the clamping ring 50, which is adapted to be clamped against the end face 31 of a pipe 32 by means of a tightening nut 30. A thin pipe 33 is clamped by means of the inner extension 3. As a result thereof, the clamping ring 50 serves as coupling between the two pipes 32 and 33 whereby the two pipes are rotatable with respect to each other and axially displaceable with respect to each other. By reason of the extraordinarily high clamping pressure produceable with the clamping ring according to the present invention, the surface of the pipe 33 may be relatively rough without deteriorating the seal below a permissive extent.

Figure 10:
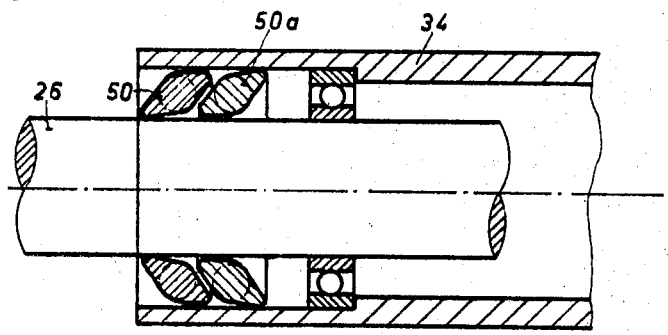

In FIG. 10, a labyrinth seal is formed of two such clamping rings 50 and 50a in that one clamping ring 50 is clamped onto a shaft 26 whereas the other clamping ring 50a is clamped fast within a surrounding housing 34.

For example, a chuck or special pincers may serve for the assembly of the clamping rings according to the present invention insofar as they are suited to apply correspondingly high pressures. One thereby normally engages at that extension of the clamping ring which is disposed opposite to the extension engaging at the clamping place.

In the applications according to FIGS. 6–9 and with the clamping ring 50 in FIG. 10, this is respectively the outer extension 4 whereas for clamping the clamping ring 50a in FIG. 10, it is the inner extension 3 which is expanded.

While several embodiments have been described according to the present invention, it is understood that the same is not limited thereto but is susceptible of numerous changes and modifications. For example, within the scope of the present invention, other numerous ring cross-sectional shapes, dimensions and armouring or reinforcements are possible in order to attain the desired tilting movement of the extension about the center section when a pressure is applied radially inwardly or radially outwardly on the other extension. However, the type of construction according to FIGS. 1 and 2 excels by its particularly simple form and multiple applicability. Consequently, the present invention is not limited to the details shown and described herein but includes all those changes and modifications as are encompassed by the scope of the appended claims.

We claim:

1. An elastic clamping ring for use as a machine element, for example for sealing-, setting-, hocking- or coupling-purposes, said ring having an axial axis and being closed upon itself in circumferential direction around said axis, said ring having clamping surfaces directed radially to said axis and said ring being radially stressable for clamping purposes, said ring having a cross section radially to said axis comprising a center portion and two end portions on opposite sides of said center portion in a direction of said axis, at least one of said end portions forming said clamping surfaces, said center portion being radially strengthened in cross section relative to each of said two end portions to such an extent that the radial moment of resistance is substantially larger in the area of said center portion than in each of said two end portions such that each of said two end portions springs radially in one radial direction upon radial stressing of the respective other of said two end portions in a radial direction opposite said one radial direction with said end portions moving rocker-like about said center portion and with the maximum outer diameter of the radially outermost of said end portions of said clamping ring being greater in the unstressed condition of the clamping ring than in the stressed condition of the clamping ring.

2. A clamping ring according to claim 1, characterized in that the radial moment of resistance of the supporting center section is made so large that the center section--during application of forces within the rated force range--remains substantially uninfluenced from the tilting movement taking place in unison about the center section during stressing and springing of the end portion.

3. A clamping ring according to claim 1, wherein one of said two end portions projects radially inwardly to form radially inwardly directed clamping surfaces, the ring inner diameter at said strengthened center portion being larger than the smallest ring inner diameter at said clamping surfaces of said radially inwardly projecting end portions.

4. A clamping ring according to claim 3, wherein the other of said two end portions projects radially outwardly and forms radially outwardly directed clamping surfaces, the ring outer diameter at said center portion being smaller than the largest ring outer diameter at said clamping surfaces of said radially outwardly projecting end portion.

5. A clamping ring for use with a part according to claim 3, characterized in that the ring inner diameter at the center portion is larger than the largest diameter, within the given tolerance range, of a part to be clamped by the inwardly directed clamping surfaces.

6. A clamping ring according to claim 4, characterized in that the ring outer diameter at the center portion is smaller than the smallest diameter, within the given tolerance range, of a part to be clamped by the outwardly directed clamping surfaces.

7. A clamping ring according to claim 1, wherein one of said two end portions projects radially outwardly and forms radially outwardly directed clamping surfaces, the ring outer diameter at said center portion being smaller than the largest ring outer diameter at said clamping surfaces of said radially outwardly projecting end portion.

8. A clamping ring for use with a part according to claim 1, characterized in that the ring inner diameter at the center portion is larger than the largest diameter, within the given tolerance range, of a part to be clamped within said clamping ring.

9. A clamping ring according to claim 11, characterized in that the ring outer diameter at the center portion is smaller than the smallest diameter, within the given tolerance range, of a part to be clamped internally by said clamping ring.

10. A clamping rign according to claim 1, characterized in that the two end portions have approximately the same radial moment of resistance.

11. A clamping ring according to claim 1, characterized in that the two end portions have approximately the same cross-sectional shape.

12. A clamping ring according to claim 11, characterized in that the two end portions have essentially straight side flanks.

13. A clamping ring according to claim 12, characterized in that one side flank of one end portion is as nearly parallel as possible to the diametrically opposite side flank of the other end portion.

14. A clamping ring according to claim 13, characterized in that the respective radially innermost and outermost side flanks of the two end portions are disposed approximately parallel to the axis of the ring when in the clamped condition, said clamping surfaces being formed on at least one of said innermost and outermost side flanks.

15. A clamping ring according to claim 14, characterized in that the two end portions taper from the center portion to free edges of said clamping ring.

16. A clamping ring according to claim 15, characterized in that the two end portions taper uniformly approximately wedge shaped from the center portion to the respective free edges of said clamping ring.

17. A clamping ring according to claim 16, characterized in that the wedge apex angle of the taper is of the order of magnitude of about 30°-60°.

18. A clamping ring according to claim 16, characterized in that the wedge apex angle is about 40°-50°.

19. A clamping ring according to claim 17, characterized in that a line bisecting each of said end portions and through the center of the center portion of the ring cross section extends obliquely to the axis of the ring.

20. A clamping ring according to claim 19, characterized in that said line extends obliquely to the axis of the ring at an angle of the order of magnitude of about 30°-60°.

21. A clamping ring according to claim 20, wherein said last-mentioned angle is about 40°-50°.

22. A clamping ring according to claim 1, characterized in that the center portion is constituted by an approximately circularly shaped core cross section.

23. A clamping ring according to claim 1, characterized by separate armoring means for the center portion.

24. A clamping ring according to claim 23, characterized in that said armoring means are arranged in the center portion.

25. A clamping ring according to claim 24, characterized by reinforcing means for said center portion.

26. A clamping ring according to claim 25, characterized in that the reinforcing means are arranged at said center portion.

27. A clamping ring according to claim 1, characterized by reinforcing means for said center portion.

28. A clamping ring according to claim 27, characterized in that the reinforcing means are arranged at said center portion.

29. A clamping ring according to claim 1, characterized in that said end portions are constructed edge-like at their respective radially innermost and radially outermost ends.

30. A clamping ring according to claim 1, characterized in that each of the end portions are also ring portions closed upon themselves in the circumferential direction.

31. A clamping ring for use with a part according to claim 1, characterized in that the clamping ring is formed in one piece with a part with which it is to be used.

32. A clamping ring according to claim 1, characterized in that each of the two end portions has at least one essentially straight side flank upon which said clamping surfaces are formed.

33. A clamping ring according to claim 32, characterized in that one side flank of one end portion is as nearly parallel as possible to a side flank of the other end portion which is diametrically opposite said one side flank with respect to said center portion.

34. A clamping ring according to claim 32, characterized in that the respective innermost and outermost side flanks of the two end portions are disposed approximately parallel to the axis of the ring in the clamped condition.

35. A clamping ring according to claim 1, characterized in that the two end portions taper from the center portion to free edges of said clamping ring.

36. A clamping ring according to claim 35, characterized in that the two end portions taper uniformly approximately wedge shaped from the center portion to the respective free edges of said clamping ring.

37. A clamping ring according to claim 36, characterized in that the wedge apex angle of the taper is of the order of magnitude of about 30°–60°.

38. A clamping ring according to claim 1, characterized in that a line bisecting each of said end portions and through the center of the center portion extends obliquely to the axis of the ring.

39. A clamping ring according to claim 38, characterized in that said line extends obliquely to the axis of the ring at an angle of the order of magnitude of about 30°–60°.

40. A clamping ring according to claim 1, wherein the minimum inner diameter of the radially innermost of said end portions of said clamping ring is substantially smaller in the unstressed condition of the clamping ring than in the stressed condition of the clamping ring.

41. A clamping ring according to claim 1, wherein ring clamping rinj includes means for clamping said ring in position on a part exclusively by radially directed elastic forces stored in said clamping ring.

42. A clamping ring according to claim 40, wherein said clamping ring includes means for clamping said ring in position on a part exclusively by radially directed elastic forces stored in said clamping ring.

* * * * *